US009395807B2

(12) United States Patent
Yoshihara

(10) Patent No.: US 9,395,807 B2
(45) Date of Patent: Jul. 19, 2016

(54) POWER MANAGEMENT APPARATUS, IMAGE FORMING APPARATUS AND POWER MANAGEMENT METHOD

(71) Applicant: CANON KABUSHIKI KAISHA, Tokyo (JP)

(72) Inventor: Toshio Yoshihara, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 428 days.

(21) Appl. No.: 13/901,490

(22) Filed: May 23, 2013

(65) Prior Publication Data

US 2013/0318384 A1  Nov. 28, 2013

Related U.S. Application Data

(63) Continuation-in-part of application No. 13/867,984, filed on Apr. 22, 2013, now abandoned.

(30) Foreign Application Priority Data

May 23, 2012 (JP) ................................ 2012-117997

(51) Int. Cl.
*G06F 1/32* (2006.01)
*G06F 1/20* (2006.01)

(52) U.S. Cl.
CPC .............. *G06F 1/3296* (2013.01); *G06F 1/206* (2013.01); *G06F 1/3203* (2013.01); *G06F 1/325* (2013.01); *G06F 1/3237* (2013.01); *G06F 1/3284* (2013.01); *G06F 1/3287* (2013.01); *Y02B 60/1221* (2013.01); *Y02B 60/1267* (2013.01); *Y02B 60/1275* (2013.01); *Y02B 60/1282* (2013.01)

(58) Field of Classification Search
CPC ...... G06F 1/3296; G06F 1/206; G06F 1/3203; G06F 1/3237; G06F 1/324; G06F 1/3287; G06F 1/325; G06F 1/3284; Y02B 60/1221; Y02B 60/1267; Y02B 60/1275; Y02B 60/1282
See application file for complete search history.

(56) References Cited

U.S. PATENT DOCUMENTS

| 7,782,498 B2 * | 8/2010 | Hoshi ........................... 358/474 |
| 2007/0266057 A1 * | 11/2007 | Utsumi ........................ 707/203 |
| 2008/0001634 A1 * | 1/2008 | Arabi et al. ..................... 326/99 |
| 2011/0173474 A1 * | 7/2011 | Salsbery et al. ............. 713/323 |
| 2012/0300254 A1 * | 11/2012 | Kato ........................... 358/1.15 |
| 2013/0173938 A1 * | 7/2013 | Yang ............................ 713/300 |

FOREIGN PATENT DOCUMENTS

| JP | 11-243604 A | 9/1999 |
| JP | 2003-345671 A | 12/2003 |

* cited by examiner

*Primary Examiner* — Dennis M Butler
(74) *Attorney, Agent, or Firm* — Fitzpatrick, Cella, Harper & Scinto

(57) ABSTRACT

A sleep mode in which power consumption is reduced to a prescribed value or smaller is achieved, while convenience for a user is maintained by shortening the time taken to recover from the sleep mode. The temperature of an LSI is measured or estimated when shifting to the sleep mode, and an apparatus enters a power supply shutoff sleep mode using power supply separation or a clock-gating sleep mode in accordance with the measured or estimated value of the temperature. In the case where power supply shutoff is selected, after entering the sleep mode, power supply is resumed and then the apparatus enters the clock-gating sleep mode in accordance with the measured temperature or the estimated temperature of the LSI.

4 Claims, 11 Drawing Sheets

F I G. 1
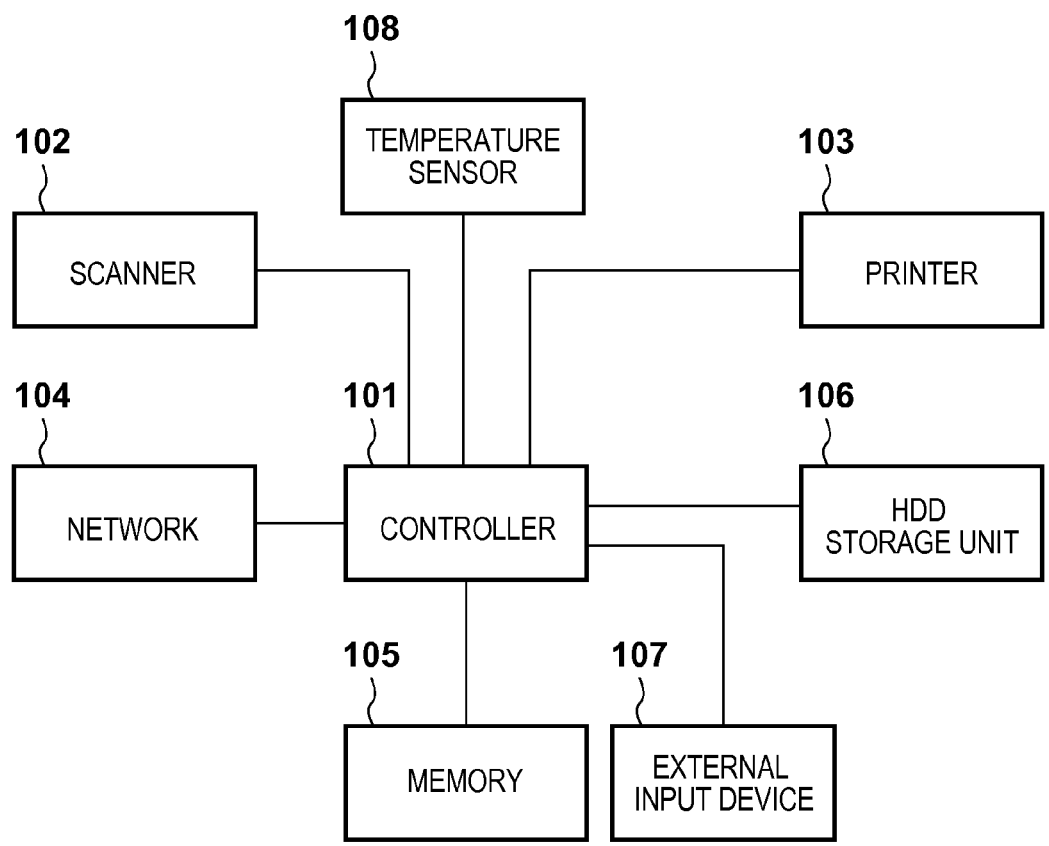

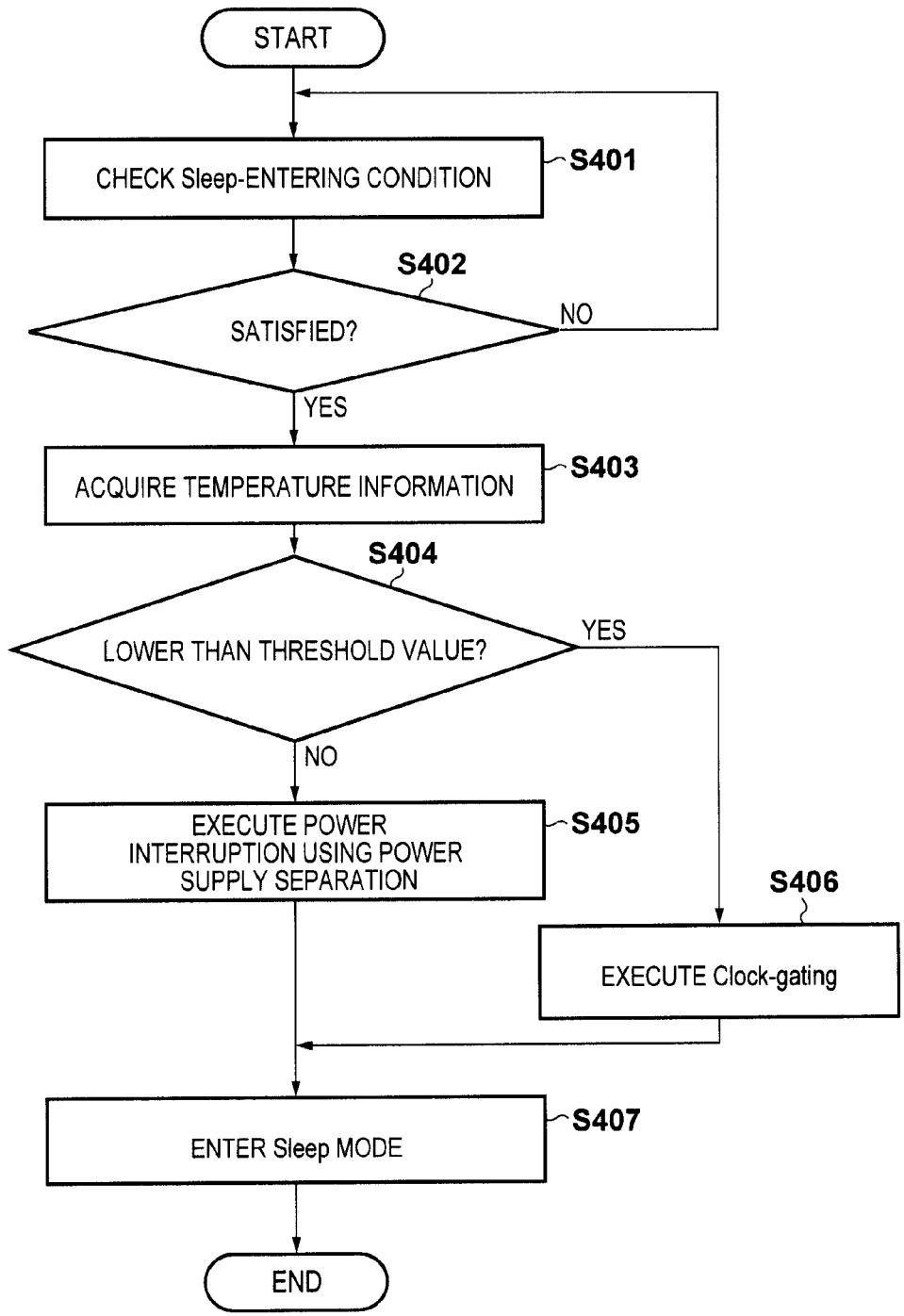

F I G. 7

| | JOB TYPE | JOB START TIME | JOB END TIME | JOB EXECUTION TIME (MINUTE(S)) | JOB INTERVAL (MINUTE(S)) |
|---|---|---|---|---|---|
| JOB5 | PDL PRINT | 10:00 | 10:20 | 0:20 | 0:12 |
| JOB4 | PDL PRINT | 9:45 | 9:48 | 0:03 | 0:14 |
| JOB3 | COPY | 9:30 | 9:31 | 0:01 | 0:10 |
| JOB2 | SEND | 9:15 | 9:20 | 0:05 | 0:13 |
| JOB1 | PDL PRINT | 9:00 | 9:02 | 0:02 | - |

F I G. 8

| | JOB TYPE | JOB START TIME | JOB END TIME | JOB EXECUTION TIME (MINUTE(S)) | JOB INTERVAL (MINUTE(S)) |
|---|---|---|---|---|---|
| JOB5 | PDL PRINT | 10:00 | 10:02 | 0:02 | 0:12 |
| JOB4 | PDL PRINT | 9:45 | 9:48 | 0:03 | 0:14 |
| JOB3 | COPY | 9:30 | 9:31 | 0:01 | 0:10 |
| JOB2 | SEND | 9:15 | 9:20 | 0:05 | 0:13 |
| JOB1 | PDL PRINT | 9:00 | 9:02 | 0:02 | - |

F I G. 9

| | JOB TYPE | JOB START TIME | JOB END TIME | JOB EXECUTION TIME (MINUTE(S)) | JOB INTERVAL (MINUTE(S)) |
|---|---|---|---|---|---|
| JOB5 | PDL PRINT | 10:00 | 10:02 | 0:02 | 0:00 |
| JOB4 | PDL PRINT | 9:58 | 10:00 | 0:02 | 0:00 |
| JOB3 | COPY | 9:40 | 9:58 | 0:18 | 0:02 |
| JOB2 | SEND | 9:36 | 9:38 | 0:02 | 0:02 |
| JOB1 | PDL PRINT | 9:30 | 9:34 | 0:04 | - |

POWER MANAGEMENT APPARATUS, IMAGE FORMING APPARATUS AND POWER MANAGEMENT METHOD

This application is a continuation-in-part of U.S. patent application Ser. No. 13/867,984, filed Apr. 22, 2013, the contents of which are incorporated by reference herein.

BACKGROUND OF THE INVENTION

1. Field of the Invention

The present invention relates to power management apparatuses for achieving energy saving in, image forming apparatuses and the like, for example, and to image forming apparatuses and the like using the same.

2. Description of the Related Art

Energy saving is gaining more and more interest worldwide these days. There are a large number of laws and regulations related to energy saving, and recently, ErP Directive Lot 6/Lot 26 and the like have been specified. The requirements of the Lot 6 directive include provision of a mode of reducing electricity to 0.5 W or less. In other words, in order that an apparatus satisfies these directives, a power-saving mode is needed in which the power consumption reliably becomes a predefined electric power (0.5 W) or smaller. Also, the requirements of the Lot 26 directive include provision of a mode of reducing average consumed power to 2 Wh/h or smaller. In other words, it is necessary to promptly enter the power-saving mode so as to reduce average power consumption. In order to meet these regulations, it is effective to reduce electricity in an LSI (large-scale integrated circuit), which is one of the elements that consume a large amount of electricity among all elements constituting an apparatus. Examples of power-saving techniques for LSIs include the clock-gating technique and the power supply separation technique. The clock-gating technique defined here is a technique of stopping a clock signal supplied to modules within an LSI by software control. The power supply separation technique is a technique of separating power supplies for the respective module groups within an LSI, and shutting a module or modules off in units of module groups. Power that is consumed in an LSI can be roughly divided into leakage power that is consumed just by supplying the power to the LSI, and dynamic power that is consumed due to switching of a transistor at the time of clock supply and data processing. The clock-gating technique can reduce dynamic power, and it is a characteristic thereof that internal register values can be retained because this technique stops only clock supply. The power supply separation technique energy saving effect is higher than the clock-gating technique because it can reduce both leakage power and dynamic power, but is disadvantageous in that restart takes time because the internal register values are lost as a result of power supply shutoff. As a measure against long recovery time in an apparatus using the power supply separation technique, it has been proposed to introduce multiple modes of power control (a shutoff mode, voltage drop mode, hold mode, etc.) and select a power control mode in accordance with waiting time for a program to be executed next (e.g., see Japanese Patent Laid-Open No. 2003-345671, etc.). Also, it is characteristics of the value of leakage power that the value is low at low temperature and is high at high temperature. Focusing on such temperature characteristics of the leakage power, a method has been proposed of measuring the temperature inside an apparatus and controlling clock frequency and the power supply of functional blocks for varying them stepwise, in accordance with the measured temperature (e.g., see Japanese Patent Laid-Open No. 11-243604, etc.).

In Japanese Patent Laid-Open No. 2003-345671, the problem of long recovery time deriving from power shutoff is addressed by not interrupting power depending on waiting time for a program to be executed next. With this method, performance can be improved by not interrupting power in some cases, but in exchange therefore, electric power is consumed during this period of time because of not interrupting power, and effective energy saving cannot be achieved. In Japanese Patent Laid-Open No. 11-243604, the clock is slowed down and functional blocks are shut down if the temperature is high, in order to prevent runaway operations due to increased temperature. With this method, power consumption can be reduced to some extent. In Japanese Patent Laid-Open No. 11-243604, however, there is no mention of provision of the power-saving mode for meeting the requirement of reduction of power consumption to a predefined amount or smaller as specified in the aforementioned Lot 6 directive.

In other words, in order to reliably execute the power-saving mode in which the power consumption is reduced to 0.5 W or smaller as specified in the Lot 6 directive, it is necessary to reduce the power using the power supply separation technique with a high power-saving effect. However, the register values are lost and the context is also lost as a result of power supply shutoff, and therefore, long recovery time is necessary. With only the clock-gating technique, which is a power-saving method with which the recovery time is short, leakage power increases at high temperature because power is supplied uninterruptedly, and there is a possibility that an apparatus cannot reliably enter the power-saving mode in which power consumption is reduced to 0.5 W or smaller.

SUMMARY OF THE INVENTION

The present invention was made in view of the foregoing conventional techniques, and realizes a power management apparatus that can promptly enter the power-saving mode from a normal operating mode to reliably reduce power consumption to a prescribed value or smaller, and that can also promptly recover from the power-saving mode to the normal operating mode in a short time, thereby maintaining convenience for a user, and an image forming apparatus and an energy management method using the power management apparatus.

The present invention has the following configuration. According to the present invention, there is provided a power management apparatus for a circuit including a power shutoff domain that can be shut off independently of another domain of the circuit, the apparatus comprising: a power management unit that turns the power shutoff domain on and off; a clock generating unit that stops and supplies a clock signal to the power shutoff domain; and a control unit that, if a condition for shifting to a sleep mode is satisfied, controls the clock generation unit to stop the clock signal and shifts to the sleep mode in a case where a measured or estimated temperature of the circuit is lower than a predetermined value, and in other cases, controls the power management unit to turn the power shutoff domain off and shifts to the sleep mode.

Further features of the present invention will become apparent from the following description of exemplary embodiments with reference to the attached drawings.

BRIEF DESCRIPTION OF THE DRAWINGS

FIG. 1 is a schematic block diagram showing an MFP system.

FIG. 4 is a flowchart illustrating a method for selecting a power-saving mode in a first embodiment.

FIG. 7 is an exemplary job history table in the case of executing the sleep mode with power supply separation.

FIG. 8 is an exemplary job history table in the case of executing the sleep mode with clock-gating.

FIG. 9 is an exemplary job history table in the case of executing the sleep mode with power supply separation.

DESCRIPTION OF THE EMBODIMENTS

Figure 2:
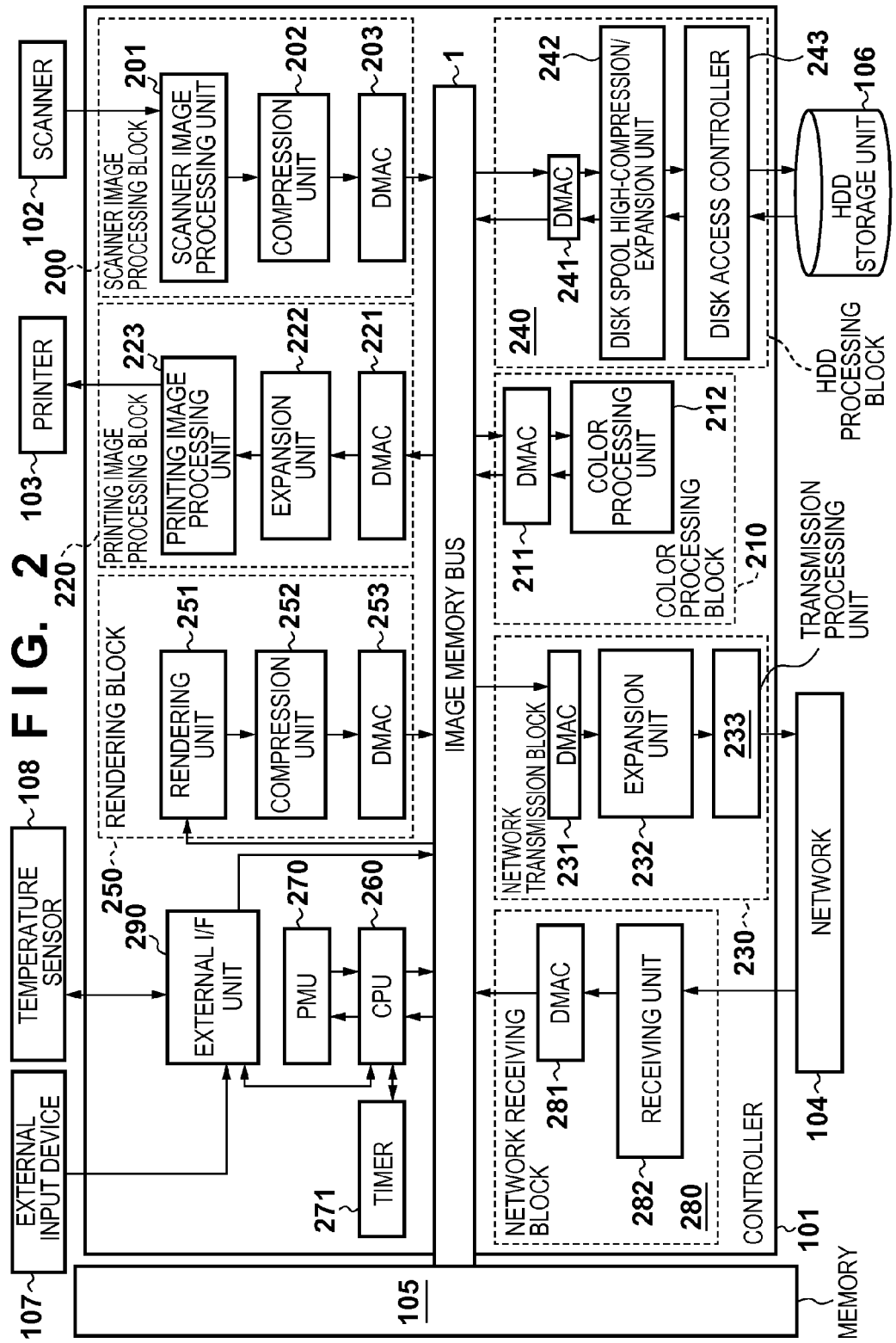
FIG. 2 is a schematic block diagram showing a controller.

Hereinafter, best modes for carrying out the present invention will be described with reference to the drawings.

First Embodiment

FIG. 1 is a diagram showing an overall configuration of a digital multi-function system (hereinafter referred to as an MFP) of one embodiment of the present invention that performs scanning, printing, and copying.

A controller 101 connects to and controls a scanner 102, which is an image input device, and a printer 103, which is an image output device. Meanwhile, the controller can input and output image information and device information, and expand image of PDL data by connecting to a network 104, such as a LAN or a public line (WAN). In the present embodiment, the controller is constituted by an LSI.

A memory 105 is a working memory of the system used for operation of the controller 101, and is also an image memory for temporarily storing image data. A HDD storage unit 106 is a hard disk drive, and stores system software and image data. An external input device 107 is a touch panel, a keyboard, or the like, and is a user interface device for a user who uses the MFP to configure various print settings and the like.

A temperature sensor 108 is for measuring the temperature inside the controller 101, and can output a measurement result to the controller.

Operation of Controller

The operation of the controller 101 in FIG. 1 will be discussed in detail with reference to FIG. 2. A description will be given of the case of reading scan data. In the controller 101 that received image data in three colors, namely RGB (red, green, blue), from the scanner 102, image processing, such as shading processing and filtering processing, is first performed on the image data by a scanner image processing unit 201. Then, image compression is performed by a compression unit 202. The compressed data is stored in the memory 105 via a DMAC (direct memory access controller) 203. A scanner image processing block 200 is the block that performs these operations.

In the case of printing scan data, the compressed data stored in the memory 105 is input to a color processing unit 212 via a DMAC 211, and the color space of the compressed data is converted into CMYK (cyan, magenta, yellow, black) color space. Thereafter, color processing for adjustments such as density adjustment and printer gamma correction is performed on a CMYK value, and then the CMYK value is again stored in the memory 105 via the DMAC 211. A color processing block 210 is the block that performs these operations.

Thereafter, in order to perform image processing for printing, the compressed data stored in the memory 105 is read via the DMAC 221, and expanded into raster image data by an expansion unit 222. The raster CMYK image data is input to a printing image processing unit 223, where area coverage modulation is performed using a dithering method or an error diffusion method, and the image data is output to the printer 103. A printing image processing block 220 is the block that performs these operations.

In the case of transmitting the scan data to the network, the compressed data stored in the memory 105 is input to the color processing unit 212 via the DMAC 211, and is subjected to color conversion. Specifically, the color space of the compressed data is converted into YCbCr (brightness, blue color difference, red color difference) after display gamma adjustment, paper ground color adjustment, and the like are performed. Thereafter, the data is again stored in the memory 105 via the DMAC 211. Thereafter, in order to perform image processing for transmission, the compressed data stored in the memory 105 is read via a DMAC 231 and expanded into raster image data by an expansion unit 232. A transmission processing unit 233 performs JPEG compression processing on the YCbCr image data in raster format in the case of color image transmission, binarizes Y data and performs JBIG compression and the like in the case of monochrome binary image transmission, and outputs the data to the network 104. A network transmission block 230 is the block that performs these operations.

In the case of storing scan data, the compressed data stored in the memory 105 is input to a disk spool high-compression/expansion unit 242 via a DMAC 241. The disk spool high-compression/expansion unit performs JPEG compression at a higher compression ratio because writing speed of the HDD is slower than that of the memory. Thereafter, the compression data is stored in the HDD storage unit 106 via a disk access controller 243. Reverse processing is performed in the case of expanding the stored data again into the memory. A HDD processing block 240 is the block that performs these operations.

The case of writing PDL data in the memory will be discussed. PDL data transmitted from the network in FIG. 1 is received by a PDL data receiving unit 282, and is stored in the memory 105 via a DMAC 281. A network receiving block 280 is the block that performs these operations.

A CPU 260 reads out and interprets the PDL data stored in the memory 105, and outputs a display list to the memory 105. Thereafter, the display list stored in the memory 105 is rendered into raster RGB image data by a rendering unit 251, and is subjected to image compression processing by a compression unit 252. The compressed data is stored in the memory 105 via a DMAC 253. A rendering block 250 is the block that performs these operations.

PDL image data can be printed, transmitted to the network, or stored by performing the same processing as processing for scan data.

A timer 271 is for counting time in response to a command from the CPU 260. An external I/F unit 290 is a block for receiving temperature information from the temperature sensor 108, and can be controlled in response to a command from the CPU 260. The external I/F unit 290 also inputs and outputs a signal from the external input device 107, and controls input and output of information from the user interface. The CPU 260 can perform various kinds of control using programs stored in the memory 105. Power supplies for the aforementioned blocks 200, 210, 220, 230, 240, 250, and 280 are separate, and supply of electricity from the power supply can be controlled for each of some blocks among them. A PMU 270 is a power supply management unit, and controls power supply to each block in the controller 101.

Control of Power Supply and Clock

Figure 3A:
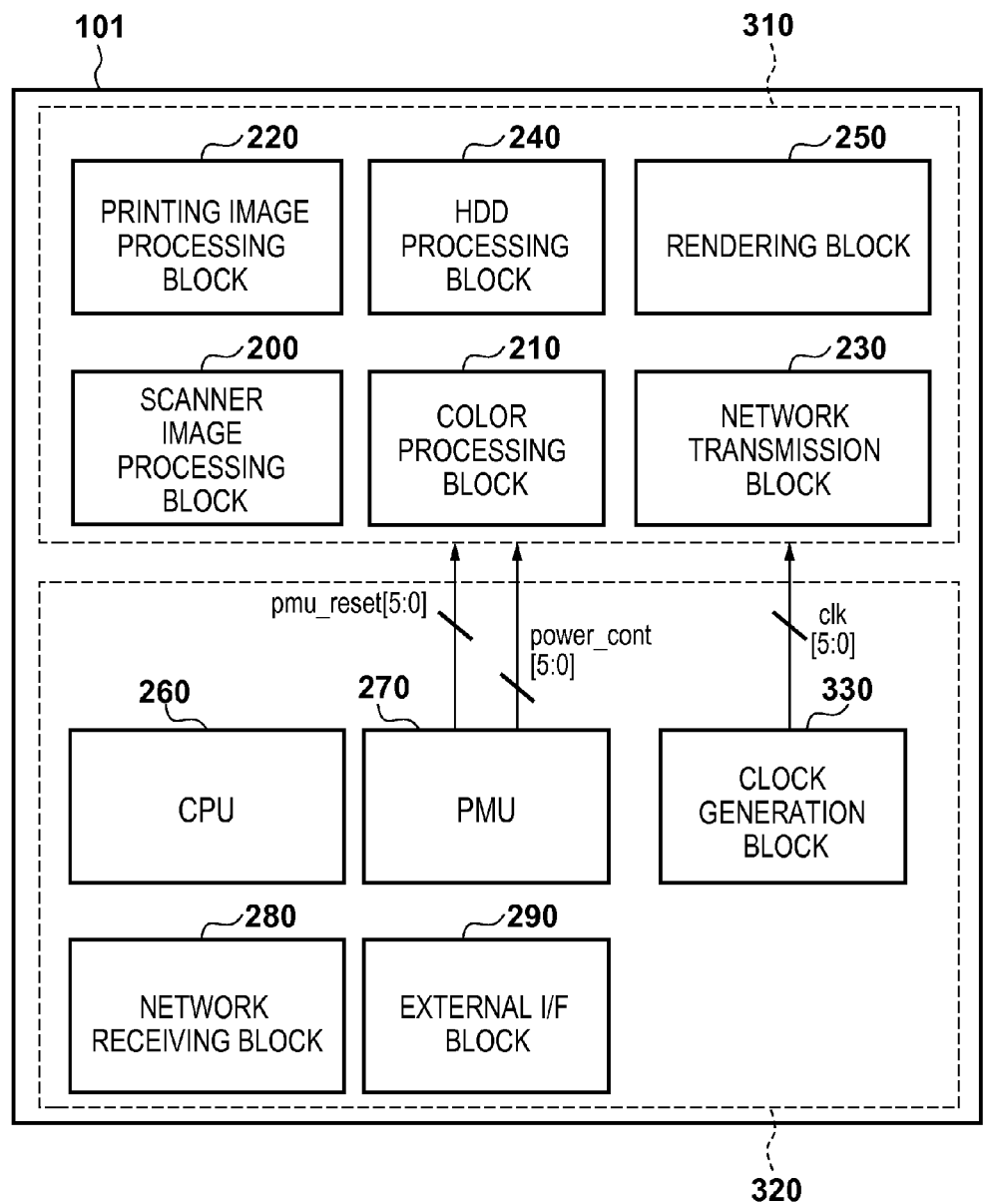
FIGS. 3A, 3B, and 3C are block diagrams of the inside of an LSI illustrating the clock-gating and power supply separation techniques.
Figure 3B:
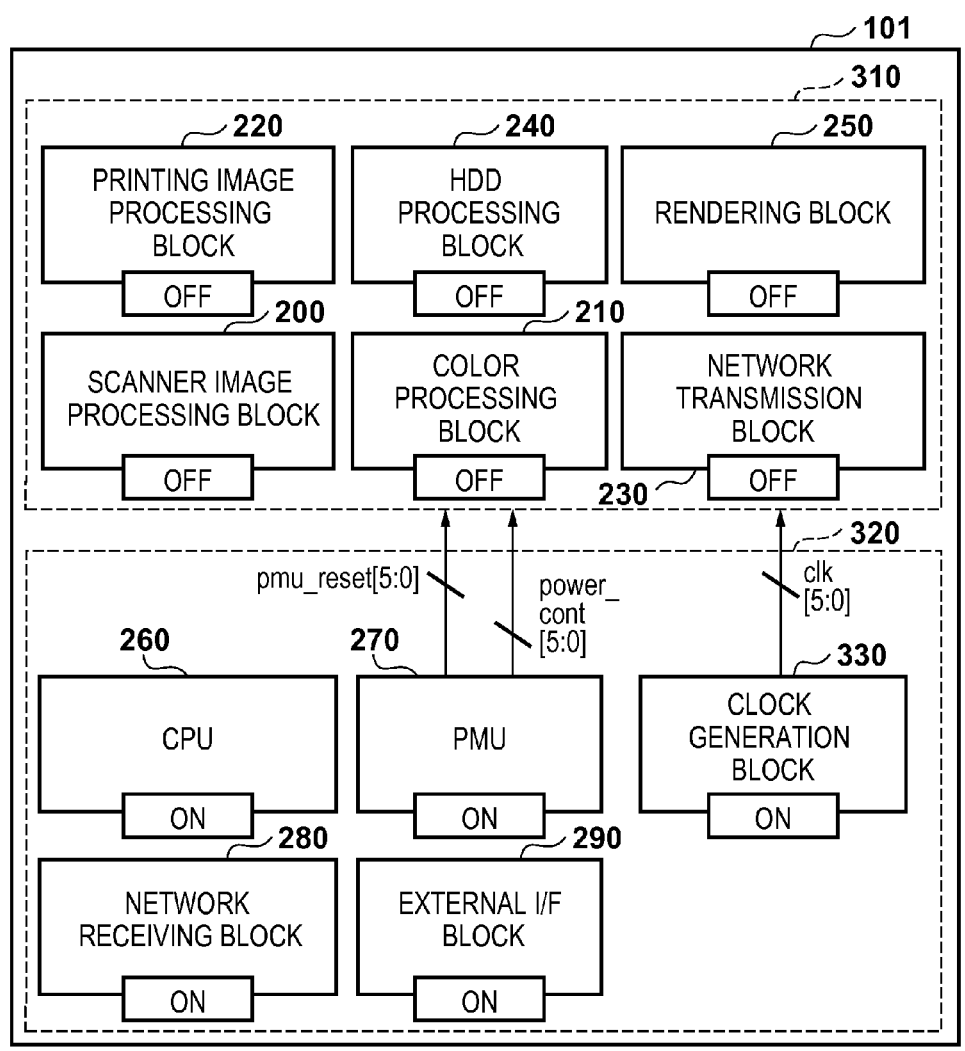
Figure 3C:
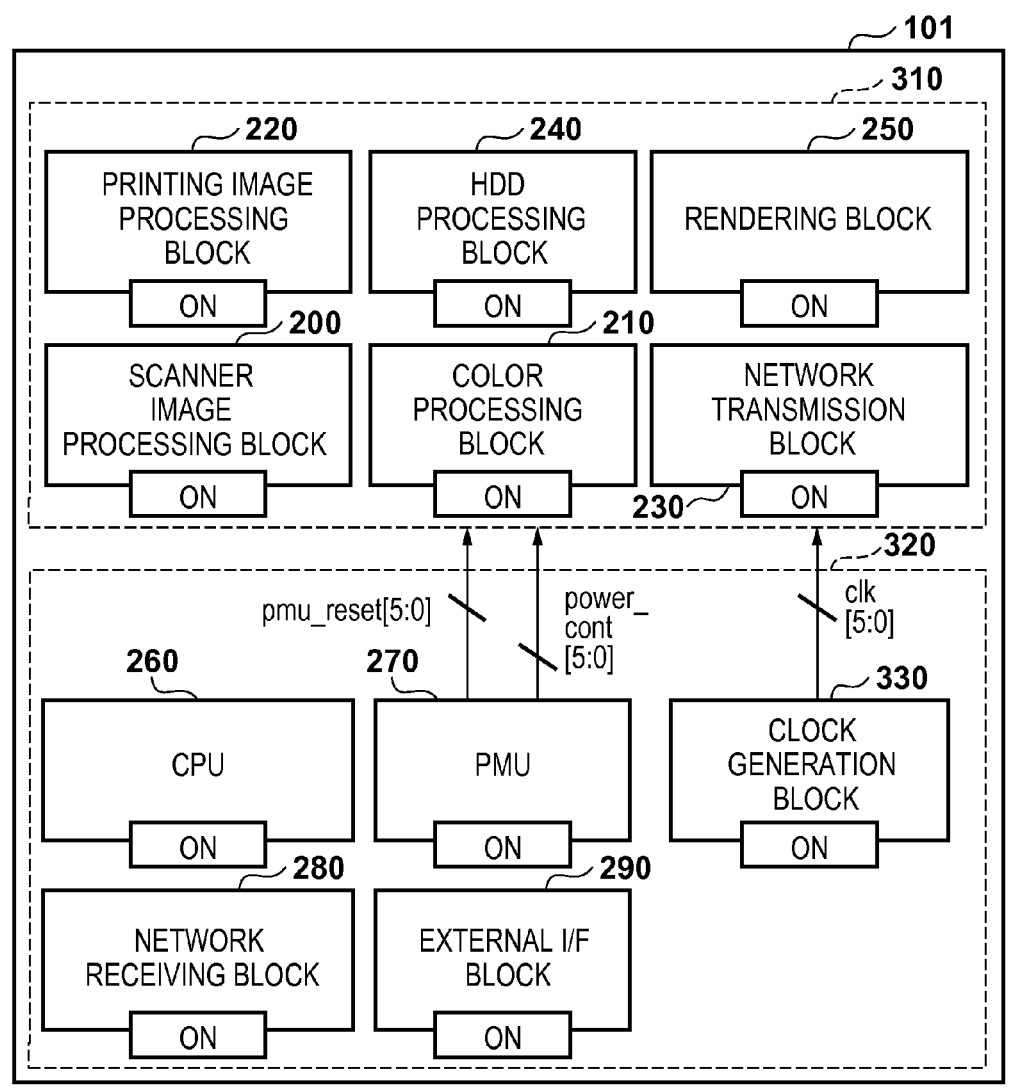

Next, a description will be given of a method of controlling the power supply and a method of gating a clock in the respective blocks whose power supplies are separate, with reference to FIGS. 3A to 3C. First, power interruption using power supply separation will be discussed. The PMU (power supply management unit) 270 operates in response to a command from the CPU 260. The PMU 270 outputs a power supply control signal power_cont and a reset control signal pmu_reset. FIG. 3A shows a power shutoff domain 310 in which power can be interrupted selectively even if a main power source is on, as well as a continuous power-on domain 320 to which power is supplied from a main power source and the power cannot be interrupted as long as the main power source is on, in the controller 101. The power shutoff domain 310 is divided into six shutoff blocks 200 to 250, and power can be interrupted for each of them. The continuous power-on domain 320 includes the CPU 260, the PMU 270, the network receiving block 280, the external I/F block 290, and a clock generation block 330. The clock generation block 330 supplies a clock signal to each block and the like in the power shutoff domain 310. The power supply control signal power_cont that is output from the PMU 270 is input to a power shutoff circuit mounted in each of the blocks 200 to 250, and the on/off state of the power for each block can be controlled. The blocks 200 to 250 of the power shutoff domain 310 for which the powers were turned on from an off state need to be reset for circuit initialization, and therefore, reset control is performed in response to the reset control signal pmu_reset that is output from the PMU 270. For example, all power for the power shutoff domain 310 are turned off in a sleep mode using supply power separation, and all power for the power shutoff domain 310 are turned on in a normal mode after recovering from the sleep mode, thereby achieving power saving. FIG. 3B is a diagram showing the on/off states of the power for each block when power interruption using power supply separation is executed. Upon execution of the power saving using power supply separation, the powers for the six blocks 200 to 250 within the power shutoff domain 310 are turned off. In addition, the powers for register blocks (not shown in the drawing) which constitute the respective blocks 200-250 are also turned off. Setting information, lookup table information, and the like that are necessary for processing of each block are stored in the register blocks. On the other hand, power is supplied to the continuous power-on domain 320.

Next, the clock-gating method will be discussed. The clock generation block 330, which is a module for generating clocks necessary for processing blocks, multiplies/divides an input clock that is input from a controller board (not shown in the drawing) on which the LSI, which is the controller 101, is mounted, and generates a desired frequency clock. Further, a gate circuit for stopping the generated clock is mounted therein, and performs gate control on the clock in response to a command of the CPU 260. In this example, the target of power management using clock-gating is each block in the power shutoff domain 310. In FIG. 3A, six clock signals clk[5:0] are input to the respective six blocks 200 to 250, and gate control can be performed on the respective blocks. In other words, all clock signals clk[5:0] are gated (i.e., stopped) in the clock-gating power-saving mode (i.e., clock-gating sleep mode), and are not gated in the normal mode after recovering from the sleep mode. FIG. 3C is a diagram showing the on/off states of the power for each block when clock-gating is executed. The powers for both the power shutoff domain 310 and the continuous power-on domain 320 are supplied and in on states. In other words, the powers for the registers of the respective blocks in the controller 101 are also on, and information necessary for processing is retained in the registers.

The advantage and disadvantage of the power saving using power supply separation and clock-gating will be discussed. Power interruption using power supply separation is advantageous in that both dynamic power and leakage power can be reduced and a high power-saving effect can be achieved, but is disadvantageous in that the recovery time becomes longer because the internal register values are lost. With clock-gating, power consumption is reduced by stopping clocks, but the achieved effect is not as great as that achieved by the power interruption using power supply separation because leakage power is consumed. However, because only the clocks are stopped, there is an advantage in that the internal register values are retained and the recovery time is shorter. In other words, it is important to use either of the above two power-saving methods in accordance with the state of the apparatus.

Flowchart Illustrating the Method for Selecting the Power-Saving Mode in the First Embodiment FIG. 4 is an exemplary flowchart illustrating a method for selecting the power-saving mode when the MFP (i.e., the image forming apparatus) enters the sleep mode in the first embodiment. The procedure shown by this flowchart is achieved by the CPU 260 controlling the blocks within the controller 101 in accordance with a program stored in the memory 105.

In step S401, a sleep-entering condition set in the apparatus is checked. The sleep-entering condition is determined based on, for example, an elapsed time from the end of the last job, and in this case, the timer 271 starts at the time of the end of a job, and the apparatus enters the sleep mode when the elapsed time reaches a predetermined time. The sleep-entering condition can be set by the user through the external input device 107.

In step S402, the CPU 260 determines whether or not the sleep-entering condition set in the apparatus is satisfied, and processing proceeds to step S403 if satisfied, and proceeds to step S401 if not. Note that if the sleep-entering condition is a lapse of a predetermined time after completion of a job, the predetermined time is set in the timer 271 and time measurement is started immediately after the end of the job, and the sleep-entering condition is satisfied at the time of expiration of the timer 271. In this case, execution of step S403 is triggered by expiration of the timer.

In step S403, the external I/F unit 290 accesses the temperature sensor 108 in response to a command from the CPU 260 and acquires temperature information, and processing proceeds to step S404.

In step S404, it is determined whether or not the temperature indicated by the temperature information acquired in step S403 is higher than or equal to the temperature of a predetermined value, which is a predetermined threshold value, and processing proceeds to step S406 if the temperature is lower than the threshold value, and proceeds to step S405 if the temperature is higher than or equal to the threshold value. With this comparison, it is determined which power-saving mode is executed, that is, which of power interruption using power supply separation (which will be referred to as a power interruption sleep mode or shutoff sleep mode) and clock-gating (which will be referred to as a clock-gating sleep mode) is executed. Here, a description will be given of how to determine the predetermined value serving as this threshold value. The LSI that constitutes the controller 101 has a characteristic that consumed power varies depending on the temperature. In other words, it has a characteristic that a larger amount of electric power is consumed at higher temperature, and a smaller amount of electric power is consumed at lower temperature. If the temperature characteristics of the power consumption are measured and stored in advance, the power consumption at each point in time can be specified using these characteristics by acquiring the temperature of the controller 101 in the standby state. The power consumption that can be reduced by clock-gating is found in advance by performing measurement. In short, it is found whether or not the value obtained by subtracting the value of power drop due to clock-gating from the power consumption value that is found from the temperature at the time of entering the sleep mode, that is, at the time of starting to enter the sleep mode from the normal mode is smaller than the power consumption value that needs to be achieved in the sleep mode. If smaller, clock-gating is executed. On the contrary, if the power consumption is larger than or equal to the power consumption value that should be achieved in the sleep mode, power interruption using power supply separation is executed. In short, the predetermined threshold value is the temperature at which the power consumption is a sum of the value of power drop due to clock-gating and the power consumption value that needs to be achieved in the sleep mode. This threshold temperature can be determined from the aforementioned temperature characteristics of power consumption. Note that, in the sleep mode described here, all power for the scanner 102, the printer 103, and the like are off, while power is applied only to the controller 101. The state of application of power to each block in the controller 101 differs depending on whether the sleep mode is the clock-gating sleep mode or the power interruption sleep mode. Also, the apparatus can recover from the sleep mode when receiving PDL data from the network, for example.

In step S405, aforementioned power interruption using power supply separation is executed, and processing proceeds to step S407. In step S406, aforementioned clock-gating is executed, and processing proceeds to step S407. In step S407, the apparatus is caused to enter the sleep mode. In other words, the power supplied to units other than the controller 101 is turned off.

The apparatus recovers from the sleep mode when, for example, receiving a PDL job from the network 104 or when accepting an input by the user from the external input device 107. In this case, interruption occurs in the CPU 260, and the CPU 260 determines whether or not to recover from the sleep mode. When recovering, the recovering procedure differs depending on whether the sleep mode is the power interruption sleep mode or the clock-gating sleep mode. Therefore, upon the CPU 260 detecting a trigger for recovering and deciding to recover to the normal mode, it is necessary to first determine whether the sleep mode is power interruption or clock-gating. For this purpose, for example, a flag that indicates which of them the sleep mode is can be set at the time of entering the sleep mode, and the sleep mode can be determined by checking the flag at the time of recovering. Alternatively, the CPU 260 can perform determination by monitoring the operation status, such as by checking the power supply control signal power_cont of the PMU 270 or the register of this signal and determining that the sleep mode is the power interruption sleep mode if the value indicates power interruption. If the sleep mode is the clock-gating sleep mode as a result of determination, the CPU 260 controls the clock control block 330 and causes it to resume supply of the clock signal. Thus, the image forming apparatus is brought into the standby state. Meanwhile, if the sleep mode is the power interruption sleep mode, the CPU 260 controls the PMU 270 and causes it to output the power control signal power_cont to resume power supply. In this case, the CPU 260 controls the PMU 270 to input the reset control signal pmu_reset to each block, and causes the PMU 270 to execute initialization processing if necessary. After the initialization processing ends, the image forming apparatus is brought into the standby state.

As described above, the sleep mode can be reliably executed in which the power consumption is reduced to a predefined value or smaller as specified in a regulation or the like, by selecting the power-saving mode from the two modes, namely power interruption sleep mode using power supply separation and clock-gating sleep mode, in accordance with the temperature of the controller 101. In this case as well, power interruption does not have to be executed every time, and clock-gating is executed if the power consumption can be reduced to be smaller than a predetermined value, and therefore, wasteful recovery time is not taken and the average recovery time can be shortened.

Modification of First Embodiment

Figure 5:
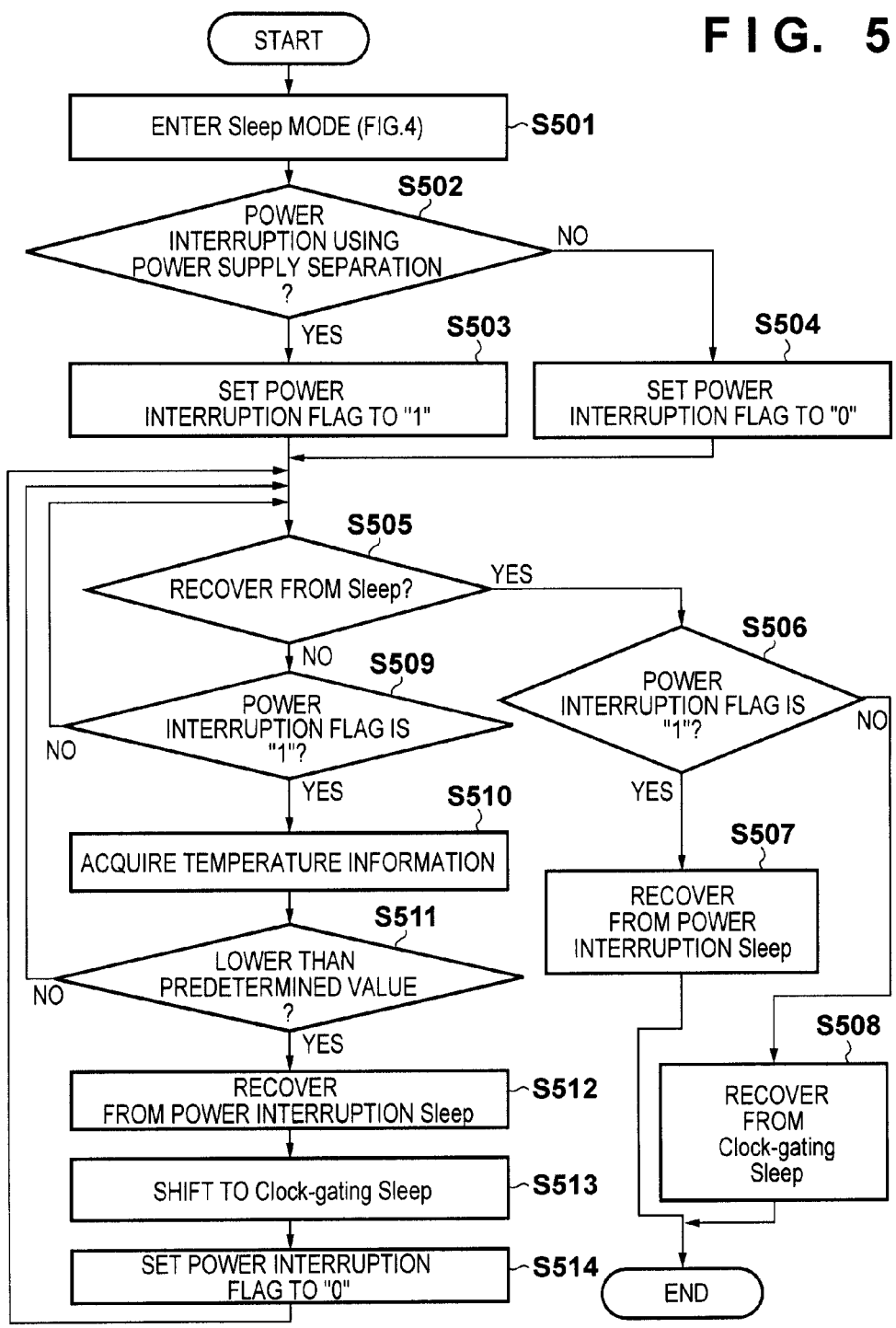
FIG. 5 is a flowchart illustrating shortening of sleep recovery time in the first embodiment.

Flowchart Illustrating Shortening of Sleep Recovery Time in Modification of First Embodiment FIG. 5 is an exemplary flowchart illustrating shortening of recovery time from the sleep mode in the first embodiment. In this example, the average time taken to recover from the sleep mode is further shortened than in the procedure of FIG. 4. The process illustrated by this flowchart is achieved by the CPU 260 controlling the blocks within the controller 101 in accordance with a program stored in the memory 105.

In step S501, the method for selecting the power-saving mode (i.e., sleep mode) illustrated in the flowchart of FIG. 4 is carried out, and processing proceeds to step S502. In step S502, it is determined which power-saving mode was selected in step S501, and processing proceeds to step S503 if power interruption sleep mode using power supply separation was selected, and proceeds to step S504 if clock-gating sleep mode was selected. In step S503, the power interruption flag defined as a register in the PMU 270 is set to "1", and processing proceeds to step S505. This register setting is configured in response to a command from the CPU 260. In step S504, the power interruption flag defined as the register in the PMU 270 is set to "0", and processing proceeds to step S505. This register setting is configured in response to a command from the CPU 260. Note that if steps S503 and S504 are executed respectively in steps S405 and step S406 in FIG. 4, steps S502 to S504 do not have to be executed again.

If a trigger event occurs, in step S505 the CPU 260 determines whether or not to recover from the sleep mode. Processing proceeds to step S506 if the apparatus recovers from the sleep mode, and proceeds to step S509 if not. The condition under which the apparatus recovers to the normal mode from the sleep mode is when, for example, the apparatus received a PDL job from the network 104 or when it accepted an input by the user from the external input device 107. In this case, interruption occurs in the CPU 260 due to such an input, which serves as an event triggering execution of step S505, and the CPU 260 determines whether or not to recover from the sleep mode. Also, in this example, the trigger event includes expiration of the timer, for example. During processing for entering the sleep mode, a predetermined value is set in the timer and the timer is started at a timing of setting the power supply shutoff flag to 1. This timer is a timer for checking the condition (in this example, temperature) under which the power supply shutoff sleep mode is shifted to the clock-gating sleep mode, and therefore, the timer value to be set may be an appropriate value. However, for example, if the characteristic of temperature decrease in the controller 101 with a lapse of time is stored in advance in the memory 105, the time taken to reach the temperature, which serves as the aforementioned condition, can be estimated by measuring the current chip temperature of the controller 101. The determination regarding condition can be performed without a useless determination and/or a waste of time, by setting the estimated time or a time that is somewhat longer than the estimated time in the timer. In step S505, it can be determined that the apparatus recovers from the sleep mode if the trigger event is not expiration of the timer.

In step S506, it is determined whether or not the power interruption flag is "1", and processing proceeds to step S507 if the power interruption flag is "1", and proceeds to step S508 if it is "0". In step S507, the apparatus recovers from the power interruption sleep mode using power supply separation, and processing for recovering from the sleep mode terminates. The procedure of recovering from the power interruption sleep mode using power supply separation is as described above. In step S508, the apparatus recovers from the clock-gating sleep mode, and processing for recovering from the sleep mode terminates. The procedure of recovering from the clock-gating sleep mode is as described above.

If the apparatus does not recover from the sleep mode, it is determined in step S509 whether or not the power interruption flag is "1", and processing proceeds to step S510 if it is "1", and proceeds to step S505 if it is "0".

In step S510, the external I/F unit 290 accesses the temperature sensor 108 in response to a command from the CPU 260 and acquires temperature information, and processing proceeds to step S511.

In step S511, it is determined whether or not the temperature that is indicated by the temperature information acquired in step S510 is lower than a predetermined threshold value, that is, a predetermined temperature, and processing proceeds to step S512 if the temperature is lower than the predetermined value, and proceeds to step S505 if larger than or equal to the predetermined value. In other words, in the case of proceeding to step S512, the power consumption can be reduced to a predetermined power or smaller as specified in a regulation or the like with the clock-gating power-saving mode. On the contrary, in the case of proceeding to step S505, the power interruption using power supply separation needs to be performed to reduce the power consumption to the predetermined power or smaller. The predetermined value used in step S511 is the same as the predetermined value described with reference to step S404 in FIG. 4. Note that the timer is set again when processing proceeds from S511 to step S505. The time to be set at this time may also be an appropriate one, while the time taken to reach the predetermined temperature obtained from the measured value of the temperature of the controller 101 at this time may alternatively be used.

In step S512, the apparatus recovers from the power interruption sleep mode using power supply separation, and processing proceeds to step S513. The procedure of recovering from the power interruption sleep mode using power supply separation is as described above. In step S513, aforementioned clock-gating is executed and the apparatus enters the sleep mode, and then processing proceeds to step S514. In step S514, the power interruption flag defined as the register in the PMU 270 is set to "0", and processing proceeds to step S505. This register setting is configured in response to a command from the CPU 260.

As described above, the sleep mode in which power consumption is reduced to a predetermined value or smaller as specified in a regulation or the like can be reliably executed by shifting from the power interruption power-saving mode using power supply separation to the clock-gating power-saving mode in accordance with the temperature in the controller 101. Also, the recovery time of the apparatus from the sleep mode when the user uses the apparatus can be shortened because the power-saving mode can be shifted to the clock-gating power-saving mode.

Note that a method for achieving large part of the procedure by software has been described with reference to FIG. 5. However, for example, a comparator can also be provided so that an output signal of the temperature sensor 108 is used as one input to the comparator, the threshold value registered in the register is used as the other input thereto, and if the temperature indicated by the output signal of the temperature sensor 108 becomes higher than or equal to the threshold value, the comparator outputs a signal to that effect. By using a logical multiplication of the output signal and the power interruption flag as one of the trigger events for executing step S505, the aforementioned timer does not need to be used as the trigger event. Further, when this trigger event is detected, the condition in steps S509 and S511 in FIG. 5 is satisfied, and it is therefore possible to promptly execute processing from step S512.

Transition of Power Consumption

Figure 11:
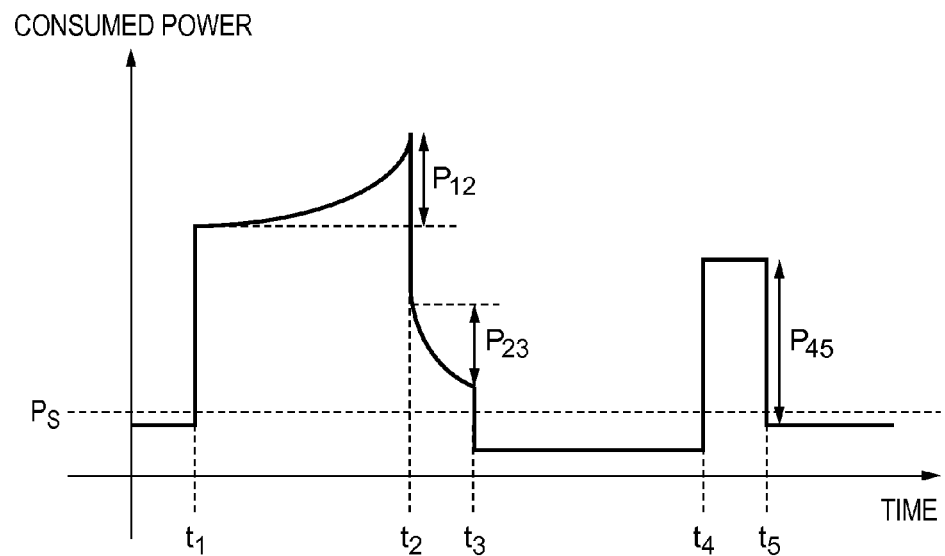
FIG. 11 is a graph showing transition of an electricity value in the case of entering to the respective power-saving modes.

FIG. 11 shows an exemplary graph indicating transition of the value of power consumption by the LSI of the controller 101 in the case where power interruption using power supply separation is executed and is then shifted to the clock-gating power-saving mode in processing of FIG. 5. Time t1 in FIG. 11 indicates processing execution start time of a job which is given to the apparatus. The consumed power increases as a result of the apparatus operating after processing starts, and further, leakage power increases due to rise of the temperature in the LSI. A value P12 indicates an increased consumed power due to rise of the LSI temperature. Time t2 indicates the time at which the given job ends, and the consumed power falls as a result of fall of the LSI temperature from the time t2. A value P23 indicates a consumed power that decreases due to fall of the LSI temperature. Time t3 is the time at which the apparatus enters the sleep mode, and corresponds to the time at which processing proceeds from step S402 to step S403 in the flowchart of FIG. 4. In the example of FIG. 11, power interruption using power supply separation is executed, and the consumed power falls after the time t3 in FIG. 11. A value Ps in FIG. 11 indicates a prescribed consumed power value in the sleep mode, and the consumed power needs to be smaller than the prescribed value Ps as long as the apparatus is in the sleep mode. Next, a description will be given of the case of shifting from the power interruption sleep mode using power supply separation to the clock-gating sleep mode illustrated in the flowchart of FIG. 5, with reference to FIG. 11. The elapsed time from the time t3 to the time t4 in FIG. 11 corresponds to the time from step S503 to step S512 in the flowchart of FIG. 5. The time t4 in FIG. 11 is the time at which the apparatus enters the normal mode in step S512 in the flowchart of FIG. 5, and the apparatus thereby recovers from power interruption sleep mode and the consumed power increases. Time t5 in FIG. 11 is the time at which step S513 is being executed, and the power consumption value falls by the value P45 as a result of clock-gating being executed.

Figure 12:
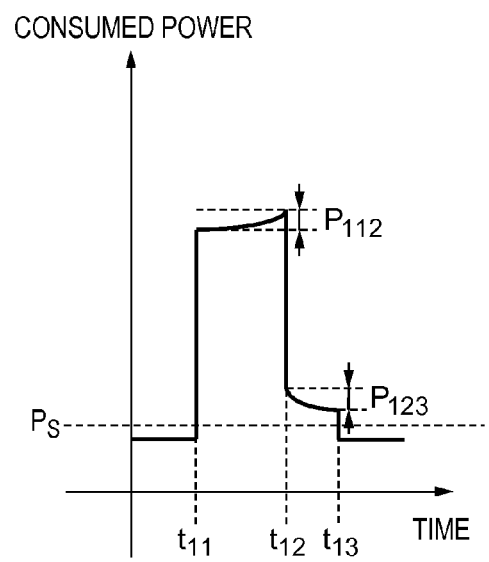
FIG. 12 is a graph showing transition of an electricity value in the case of entering clock-gating.

FIG. 12 is an exemplary graph of transition of the electricity value in the case of executing clock-gating in processing of FIG. 4 or FIG. 5. Unlike in FIG. 11, an electricity value P112 indicating an increase of the consumed power due to rise of the LSI temperature is small, and it is thus indicated that the consumed power falls below the prescribed value Ps if the apparatus enters the clock-gating power-saving mode at the time t13 in FIG. 12. In other words, it is indicated that, because a job execution time that is a time interval from time t11 to time t12 in FIG. 12 is short, the LSI temperature increases slightly and the consumed power falls below the prescribed value Ps even in the clock-gating power-saving mode.

As described above, according to this embodiment, the power consumption in the sleep mode is reduced to the predetermined value or lower, and the average recovery time is shortened by more frequently using the clock-gating sleep mode from which the apparatus can quickly recover to the normal mode.

Note that the image forming apparatus has been taken as an example in the description of the present embodiment, the present invention can also be applied to an apparatus other than the image forming apparatus as long as the apparatus employs an LSI in which the power for the respective blocks are separate and a sleep mode can be switched appropriately between between the power interruption sleep mode and the clock-gating sleep mode. In this case, the processing blocks for carrying out processing for image formation that are disposed in the power shutoff domain 310, such as the printing image processing block 220, the scanner image processing block 200, the color processing block 210, and the rendering block 250, need only be replaced with functional blocks for the apparatus in which the controller is mounted. Also, a memory that fixedly stores program codes for causing the CPU to execute the flow of FIG. 4 or FIG. 5 may be provided together with the controller 101 as an integrated LSI, or as an integrated package. This also applies to the second embodiment.

Second Embodiment

In the first embodiment, switching between the two power-saving modes, namely the power interruption sleep mode using power supply separation and the clock-gating sleep mode, is performed in accordance with the temperature inside the controller 101. In the second embodiment, the determination based on the temperature in the first embodiment is performed based on a history of the job execution time during which the apparatus processes a job. In the present embodiment, it is determined which of the power interruption sleep mode and the clock-gating sleep mode is performed, based on an estimated temperature by estimating the temperature in the controller LSI based on a job type, the job execution time, a job interval, and the like, and the temperature information may be estimated in step S403 in FIG. 4 and the temperature estimated in step S404 may be compared with the threshold value. However, for this purpose, it is necessary to measure and store in advance, for each job type, characteristics indicating the relationship between the job execution time and the LSI temperature, the relationship between the elapsed time after the job ends and the LSI temperature, and the like, and to estimate the temperature by checking these characteristics. In the present embodiment, a method will be described for managing power supply using the time, without storing such characteristics.

Figure 6:
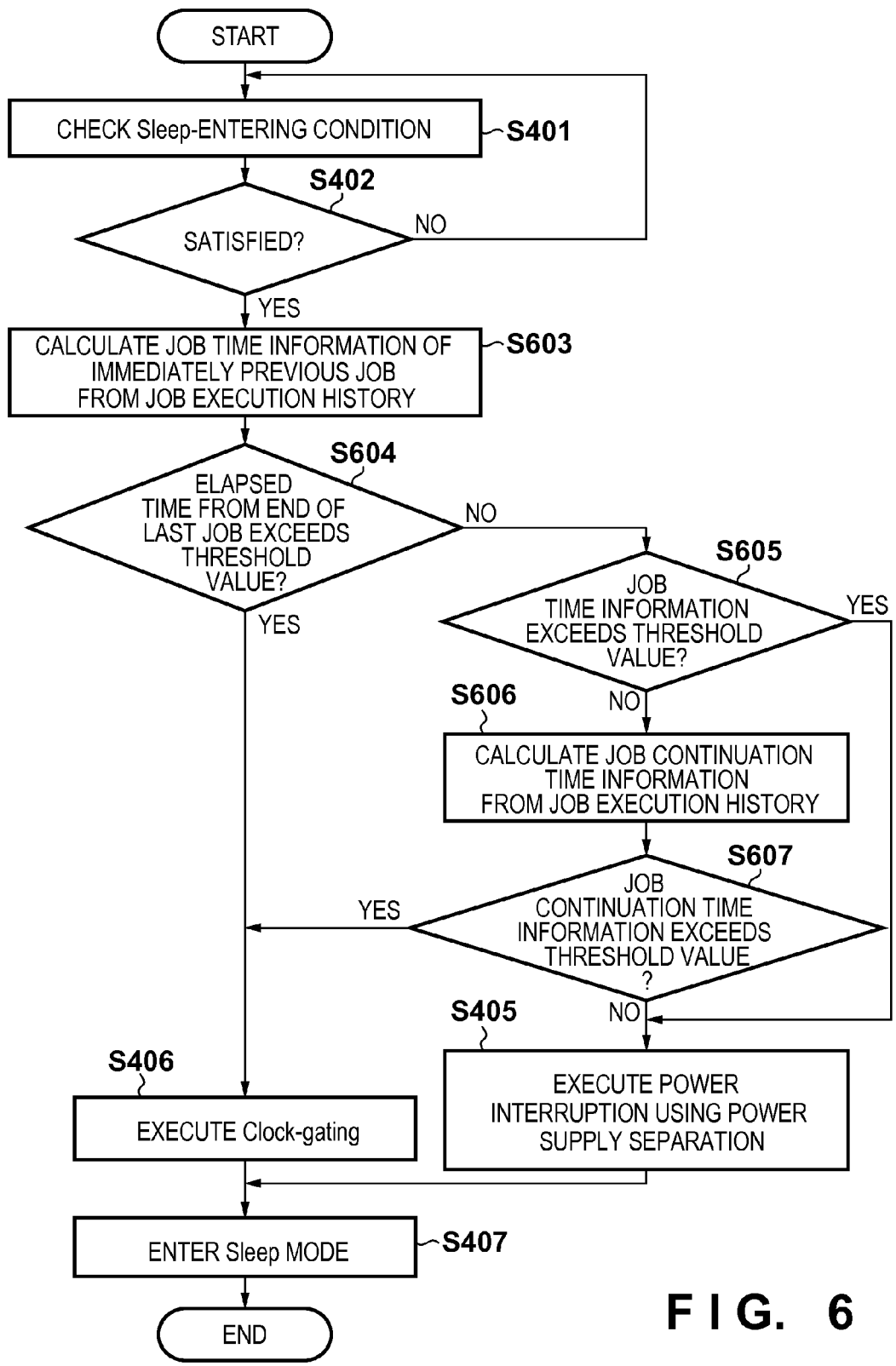
FIG. 6 is a flowchart illustrating a method for selecting the power-saving mode in a second embodiment.

Flowchart Illustrating a Method for Selecting the Power-Saving Mode in the Second Embodiment FIG. 6 is an exemplary flowchart illustrating a method for selecting the power-saving mode when entering the sleep mode in the second embodiment. This flowchart is achieved by the CPU 260 controlling the blocks within the controller 101 in accordance with a program stored in the memory 105. Steps S603 to S607 will be described, which are the difference from FIG. 4 in the first embodiment. The configuration of the controller 101, the function of each block, and the steps that are common to those in FIG. 4 are the same as those in the first embodiment, and the description thereof will be omitted.

In step S603, a job execution history of job that was immediately previously executed is read, job time information is calculated, and the processing proceeds to step S604. FIGS. 7, 8, and 9 show examples of the job execution history. In these examples, the job history of up to five jobs, namely jobs 1 to 5, is stored in a history memory such as a memory or a hard disk, and the job type, job start time, job end time, job execution time, and time of a job interval from the previous job are stored for each job. Next, the job time information will be described, taking FIG. 7 as an example. The job time information is information for estimating the temperature of the LSI from the relationship between the job type, the job execution time indicating the time during which the controller 101 continuously operated, and the job interval indicating the interval between successive operations, and, in other words, the job time information is an index value corresponding to the estimated temperature value. The job interval from the previous job indicates an elapsed time from the job end time of the previous job to the current time, and the job execution time indicates the time from the start to the end of the job. These times may be recorded in the history every time the job starts and ends, or may be calculated and recorded in step S603. The job time information can be a value obtained by multiplying the execution time of an immediately previously executed job by a weight according to the job type, for example. This weight is determined in advance, and is determined for each job type to be, for example, a value indicating the temperature in accordance with the execution time. This is because the blocks to be used possibly differ depending on the job type. For example, all blocks are used for copying, while the image processing blocks in the printer and scanner are not used for a job of performing box storage of image data. Thus, because the power consumption differs depending on the job type, the weight for each job type is determined based on the job execution time and the measured LSI temperature. Alternatively, instead of assigning the weight to the job execution time, the inverse number of the weight may be assigned to a time threshold value, which is referred to in step S605. Of course these are examples, and any information that is directly related to the estimated LSI temperature can be used as the job time information. This job time information is calculated in step S603.

In step S604, it is determined whether or not the interval from the end of the last job to the current time exceeds the time threshold value. As this time threshold value, for example, the time is selected until when the LSI temperature that can be achieved as a result of execution of the job reaches the temperature of the threshold value (i.e., the threshold value for switching between clock-gating sleep mode and power interrupt sleep mode) referred to in step S404 in FIG. 4 during the normal operating mode after the job ends. The temperature that the LSI can reach depends on the cooling capability, assembly density, and the like of the apparatus, and therefore, the time threshold value can be obtained by actual measurement. At the point of step S604, at least a predetermined time for entering the sleep mode should have elapsed since the end of the last job, but the time threshold value in step S604 is set separately therefrom. If the elapsed time after the end of the last job exceeds the time threshold value, it can be determined that the LSI temperature has decreased to a temperature at which power consumption can be reduced to a predetermined value or smaller as specified in a regulation or the like in the clock-gating power-saving mode. Accordingly, processing proceeds to step S406 in this case. On the other hand, if the elapsed time does not exceed the time threshold value, that is, if it is determined that the predicted LSI temperature possibly exceeds the temperature at which power consumption can be reduced to the predetermined value or smaller as specified in a regulation or the like with the clock-gating power-saving mode, processing proceeds to step S605.

In step S605, it is determined whether or not the job time information calculated in step S603 exceeds a threshold value. If the job time information exceeds the threshold value, that is, if it is determined that the current LSI temperature estimated from the job type and the job execution time of the immediately previous job is a temperature at which power consumption cannot be reduced to the predetermined power consumption value or smaller as specified in the regulation or the like with the clock-gating power-saving mode, processing proceeds to step S405. The threshold value referred to in step S605 is a value of the job time information that, when converted into a temperature, corresponds to the temperature referred to in step S404 in FIG. 4. Because the relationship between the job time information and the LSI temperature is obtained in advance by measurement as mentioned above, the value of the job time information to be the threshold value can be specified based on this relationship, and is used as the threshold value in step S605. On the other hand, in step S605, if the job time information does not exceed the threshold value, that is, if it is determined that the current LSI temperature estimated from the job type and the job execution time of the immediately previous job is possibly a temperature at which power consumption can be reduced to a predetermined power consumption value or smaller as specified in a regulation or the like in the clock-gating power-saving mode, processing proceeds to step S606.

In step S606, job continuation time information is calculated from the job execution history, and processing proceeds to step S607. The job continuation time information is calculated if it is determined from the immediately previous job that the power consumption can possibly be reduced to a predetermined value or smaller as specified in the regulation or the like with the clock-gating power-saving mode. The job continuation time information is information for estimating the current LSI temperature from the job types, the job execution times, and the job intervals of the past jobs including the immediately previous job. In other words, because heat is cumulatively accumulated if jobs are successively executed, the LSI temperature is possibly high even if the execution time of the last job is short. Therefore, for example, an interval between the last job and the immediately previous job can be employed as the job continuation time information. In this case, the threshold value used in step S604 can be employed as the threshold value referred to in step S607, while a threshold value that is somewhat larger than that may alternatively be employed in order to increase the possibility that the temperature reaches a steady temperature.

Alternatively, it is also possible to trace the job history and calculate, as the job continuation time information, the value corresponding to the temperature reached due to the accumulated heat. In this case, the number of jobs to be traced is defined in advance. If a sufficient interval is present between two of these jobs during which the LSI temperature reaches a steady state, jobs executed before the interval are not taken into account. Then, the job execution times of the jobs for which the job continuation time information is calculated are weighted in accordance with, for example, the job types thereof, and the weighted job execution times are summed. Further, the value obtained by subtracting the summed value of job interval times from the summed value of the weighted job execution times is used as the job continuation time information. This is based on an assumption that the temperature increase ratio during job execution and the temperature decrease ratio after the end of the job are almost the same, while more accurate job continuation time information can be obtained by actually measuring the decrease ratio, determining a weight for setting the decrease ratio to about the same as the increase ratio, and assigning this weight to the summed value of the time intervals. In this case, the obtained job continuation time information takes a larger value as the estimated temperature is larger, and is not consistent with step S607 in FIG. 6. Therefore, for example, the signs are reversed to keep the consistency. Of course this is for the sake of convenience in line with the drawings, and is not related to the essence of the invention.

In step S607, it is determined whether or not the job continuation time information exceeds a threshold value. If the interval between the last job and the immediately previous job is employed as the job continuation time information, in step S607 the job continuation time information is compared with the threshold used in step S604. If the job continuation time information exceeds the threshold value, that is, if the last job was started in a state in which the temperature is at a steady temperature, it is determined that the estimated LSI temperature is a temperature at which power consumption can be reduced to a prescribed value or smaller with clock-gating. If so, processing branches to step S406. If not, power interruption using power supply separation is executed in step S405.

Step S607 will be described using the job execution history of FIG. 8, for example. In the example of FIG. 8, the job execution time of the immediately previous job is as short as 2 minutes, and it is therefore determined in step S605 that the job time information is smaller than or equal to the threshold value, and processing proceeds to step S606. Then, the job interval between jobs 1 and 2 is calculated as the job continuation time information in step S606. Because this job interval is as long as 12 minutes and thus exceeds the threshold value in step S607, the clock-gating power-saving mode is applied in step S406. On the other hand, in the example of the job execution history of FIG. 9, the job interval between jobs 1 and 5 is short and the sum of the job execution times is long, and it is therefore determined that the job continuation time information does not exceed the threshold value in step S607, and processing proceeds to step S405 where power interruption using power supply separation is executed. Note that the same result is obtained also in the case where the latter is employed of the above two examples of the job continuation time information.

Here, a description is given of a method for estimating the LSI temperature from the job time information and the job continuation time information. As described above, for example, the LSI temperature can be estimated by actually measuring the LSI temperature with respect to PDL printing execution time, and the estimation is possible by acquiring the measured data for each job in advance.

As described above, the sleep mode can be reliably executed in which power consumption is reduced to a predetermined value or smaller as specified in a regulation or the like, by selecting, using the job execution history, the power-saving mode from the two modes, namely power interruption using power supply separation and clock-gating. In this case as well, power interruption does not have to be executed every time, and clock-gating can be executed as appropriate, and it is therefore not necessary to take wasteful recovery time. Also, even though the temperature sensor is necessary in the first embodiment, the temperature sensor is not necessary in the second embodiment, which is advantageous in terms of costs.

Modification of Second Embodiment

The present modification corresponds to the modification of the first embodiment. However, although the temperature is measured and power interruption is shifted to clock-gating in the first embodiment, the power interruption is shifted to the clock-gating sleep mode after a lapse of a predetermined time after entering the power interruption sleep mode in the present embodiment. The procedure thereof will be discussed below.

Figure 10:
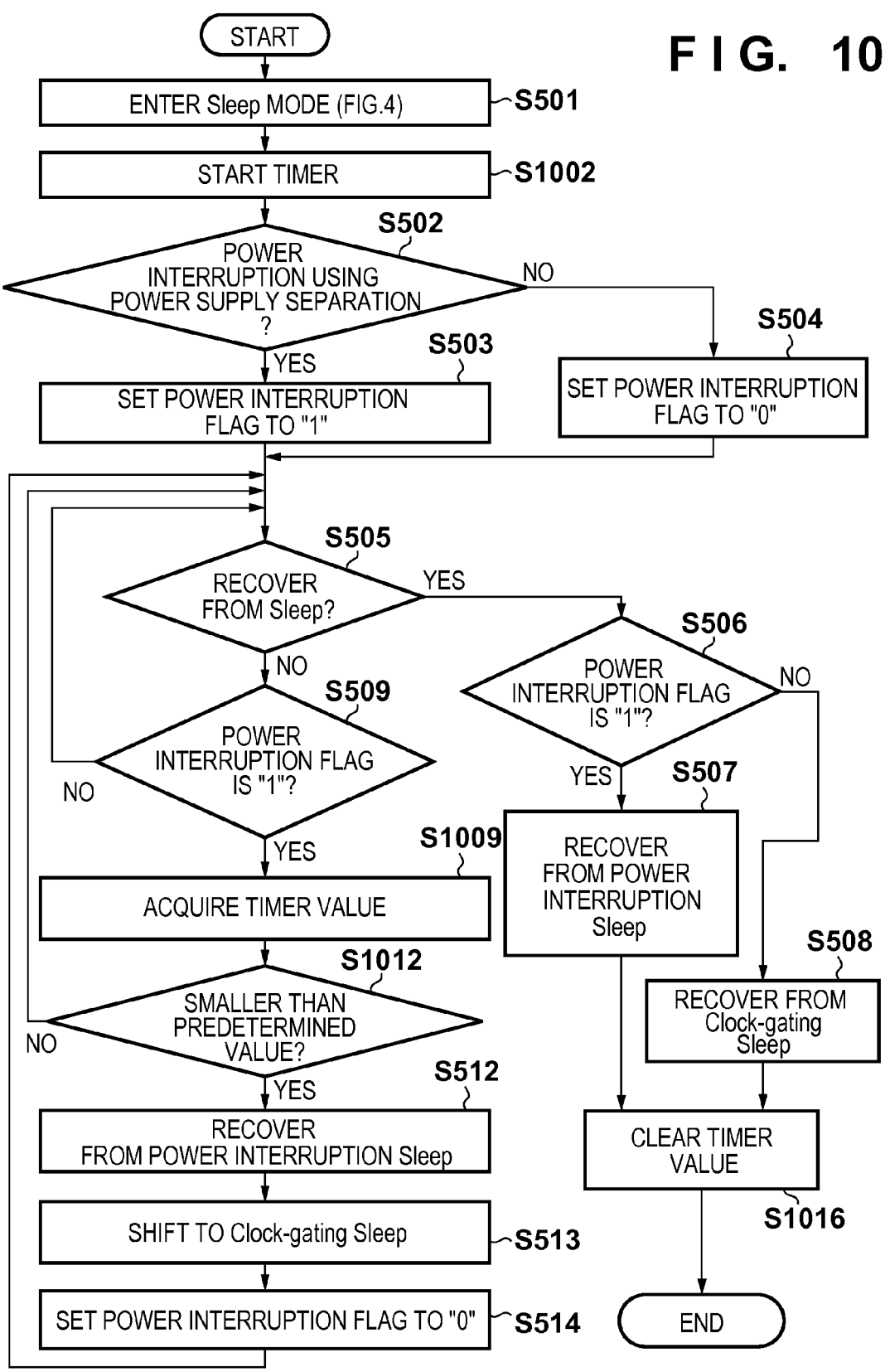
FIG. 10 is a flowchart illustrating shortening of sleep recovery time in the second embodiment.

Flowchart Illustrating Shortening of Sleep Recovery Time in the Second Embodiment FIG. 10 is an exemplary flowchart illustrating shortening of sleep recovery time in the second embodiment. This flowchart is achieved by the CPU 260 controlling the blocks within the controller 101 in accordance with a program stored in the memory 105. Steps S1002, S1009, S1012, and S1016 will be described, which are the difference from FIG. 5 in the first embodiment.

In step S1002, the timer 271 is started to begin measurement of time after entering the sleep mode, and processing proceeds to step S502.

In step S1009, the timer time of the timer 271 is acquired, and processing proceeds to step S1012. In step S1012, the timer value is compared with a predetermined threshold value, and it is determined whether or not the timer value is smaller. As the threshold value here, a sufficient elapsed time is selected during which, with a lapse of time after entering the sleep mode, the estimated LSI temperature decreases to a temperature at which power consumption can be reduced to a predetermined value or smaller as specified in a regulation or the like even if the power interruption power-saving mode is shifted to the clock-gating power-saving mode. It can be determined experimentally, for example, while the threshold value referred to in step S604 in FIG. 6 may alternatively be used.

In step S1016, the value of the timer that was started after recovering from the sleep mode is cleared, and processing ends.

As described above, the sleep mode in which power consumption is reduced to a predetermined value or smaller as specified in a regulation or the like can be reliably executed by shifting from the power interruption power-saving mode using power supply separation to the clock-gating power-saving mode with a lapse of time after entering the sleep mode. Also, the sleep recovery time of the apparatus when the user uses the apparatus can be shortened because the power-saving mode can be shifted to the clock-gating power-saving mode. Also, even though the temperature sensor is necessary in the first embodiment, the temperature sensor is not necessary in the second embodiment, which is advantageous in terms of costs.

The graph of transition of the consumed power in the case of the second embodiment will be described with reference to FIGS. 11 and 12. The basic idea is the same as in the first embodiment, and a description will be given, focusing on the relationship with the flowcharts in FIGS. 6 and 10. First, FIG. 11 is discussed. Time t3 in FIG. 11 is the time for entering the sleep mode, and is the time for shifting from step S402 to step S603 in the flowchart of FIG. 6. Then, processing from step S604 to step S607 is executed at the time t3 in FIG. 11. The time t3 to t4 in FIG. 11 corresponds to processing from step S1009 to step S1012 in the flowchart of FIG. 10. The time t4 in FIG. 11 is the time for shifting from step S1012 to step S1013 in the flowchart of FIG. 10, and thereby, the power consumption increases due to recovering from power interruption sleep mode. The time t5 in FIG. 11 is the time at which step S1014 is being executed, and the power consumption value falls by P45 as a result of execution of clock-gating. Next, FIG. 12 will be described. FIG. 12 illustrates the case in which steps S603 to S607 in the flowchart of FIG. 10 are executed at time t13 and YES is selected in the determination in step S607. Both drawings are the same as described in the first embodiment.

Note that although a plurality of time threshold values are referred to in the present embodiment, these are referred to as, for example, a first predetermined time, a second predetermined time, and the like in some cases.

Other Embodiments

The present invention is also achieved by executing the following processing. In other words, software (program) that achieves the functions in the above-described embodiments is supplied to a system or an apparatus via a network or a various recording media, and a computer (or a CPU, an MPU, etc.) in the system or the apparatus reads out the program to execute processing.

According to the configuration of the above-described embodiments, mobile terminals can be used more easily.

Although the preferred embodiments of the present invention have been described above, the present invention is not limited to those specific embodiments, and various modifications and changes can be made within the scope of the gist of the present invention described in the scope of claims.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-117997, filed May 23, 2012, which is hereby incorporated by reference herein in its entirety.

What is claimed is:

1. A power management apparatus for a circuit including a power shutoff domain that can be shut off independently of another domain of the circuit, the apparatus comprising:
a power management unit that turns the power shutoff domain on and off;

a clock generating unit that stops and supplies a clock signal to the power shutoff domain;

a control unit that, if a condition for shifting to a sleep mode is satisfied, controls the clock generation unit to stop the clock signal and shifts to the sleep mode in a case where a measured or estimated temperature of the circuit is lower than a predetermined value, and controls the power management unit to turn the power shutoff domain off and shifts to the sleep mode in a case where the measured or estimated temperature of the circuit is higher than or equal to the predetermined value; and a time measurement circuit for measuring a set time, wherein the control unit calculates an index value corresponding to an estimated temperature of the circuit based on time information including a time during which the power shutoff domain continuously operated and an interval between successive operations, and determines whether or not the temperature of the circuit is estimated to be higher than or equal to the predetermined value based on the index value.

2. The power management apparatus according to claim 1, wherein, in the case where the control unit has controlled the power management unit to turn the power shutoff domain off and has shifted to the sleep mode, the control unit controls the power management unit to turn the power shutoff domain on, thereafter controls the clock generation unit to stop the clock signal in the sleep mode, if the measured or estimated temperature of the circuit is higher than or equal to the predetermined value.

3. The power management apparatus according to claim 1, further comprising temperature measurement unit that measures the temperature of the circuit, wherein the control unit uses the temperature measured by the temperature measurement unit as the temperature of the circuit.

4. An image forming apparatus comprising a controller for a circuit including a power shutoff domain that can be shut off independently of another domain of the circuit, the controller comprising:

a power management unit that turns the power shutoff domain on and off;

a clock generating unit that stops and supplies a clock signal to the power shutoff domain;

a control unit that, if a condition for shifting to a sleep mode is satisfied, controls the clock generation unit to stop the clock signal and shifts to the sleep mode in a case where a measured or estimated temperature of the circuit is lower than a predetermined value, and controls the power management unit to turn the power shutoff domain off and shifts to the sleep mode in a case where the measured or estimated temperature of the circuit is higher than or equal to the predetermined value, wherein a processing block for carrying out processing for image formation is included in the power shutoff domain; and further comprising, in the controller, a unit that stores history of a job executed for image formation; and a time measurement unit that measures a set time, wherein the control unit calculates an index value corresponding to an estimated temperature of the circuit based on time information including a time during which the power shutoff domain continuously operated and an interval between successive operations, and determines whether or not the temperature of the circuit is estimated to be higher than or equal to the predetermined value based on the index value, and a job type, a job execution time and a time interval between jobs that are stored as the history of a job serve as the time information.

* * * * *